United States Patent
Finkelstein et al.

(10) Patent No.: US 8,886,662 B1
(45) Date of Patent: *Nov. 11, 2014

(54) GENERATING WORD COMPLETIONS BASED ON SHARED SUFFIX ANALYSIS

(71) Applicant: Google Inc., Mountain View, CA (US)

(72) Inventors: Lev Finkelstein, Netanya (IL); Eddo Kim, Raanana (IL); Ari Shotland, Haifa (IL); Alon Mittelman, Tel-Aviv (IL)

(73) Assignee: Google Inc., Mountain View, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 13/858,208

(22) Filed: Apr. 8, 2013

Related U.S. Application Data

(63) Continuation of application No. 13/239,251, filed on Sep. 21, 2011, now Pat. No. 8,417,718.

(51) Int. Cl.
  *G06F 17/30* (2006.01)

(52) U.S. Cl.
  CPC ................................ *G06F 17/3097* (2013.01)
  USPC ....................................................... 707/767

(58) Field of Classification Search
  USPC .......................... 707/713, 767, 759, 765, 766
  See application file for complete search history.

(56) References Cited

U.S. PATENT DOCUMENTS

| | | | |
|---|---|---|---|
| 7,260,568 B2 | 8/2007 | Zhang et al. | |
| 7,461,059 B2 | 12/2008 | Richardson et al. | |
| 7,487,145 B1 | 2/2009 | Gibbs et al. | |
| 7,499,940 B1 | 3/2009 | Gibbs | |
| 7,739,264 B2 * | 6/2010 | Jones et al. | 707/713 |
| 7,756,855 B2 | 7/2010 | Ismalon | |
| 7,836,044 B2 | 11/2010 | Kamvar et al. | |
| 8,190,601 B2 * | 5/2012 | Ahari et al. | 707/722 |
| 8,275,786 B1 | 9/2012 | Dave et al. | |
| 8,452,795 B1 * | 5/2013 | Finkelstein et al. | 707/767 |
| 8,554,755 B2 | 10/2013 | Richardson et al. | |
| 2008/0077588 A1 | 3/2008 | Zhang et al. | |
| 2009/0037399 A1 * | 2/2009 | Bartz et al. | 707/5 |
| 2009/0049020 A1 | 2/2009 | Im | |
| 2009/0094145 A1 | 4/2009 | Kim et al. | |
| 2011/0161311 A1 | 6/2011 | Mishne et al. | |
| 2011/0264683 A1 * | 10/2011 | Kang et al. | 707/769 |
| 2012/0166182 A1 | 6/2012 | Ko et al. | |

FOREIGN PATENT DOCUMENTS

WO    2006055120    7/2006

* cited by examiner

*Primary Examiner* — Cam-Linh Nguyen
(74) *Attorney, Agent, or Firm* — Middleton Reutlinger

(57) ABSTRACT

A technology is described herein for identifying suggested query completions for a partial query based upon unique queries which have suffixes similar to the suffix of the partial query, but have prefixes which do not contain the prefix of the partial query. The technology described herein selects suggested query completions for the partial query based on terms occurring at the ends of the unique queries, in a manner which is not limited to past queries that include all of the terms in the partial query. As a result, meaningful suggested query completions that are likely to assist the user in completing a partial query can be provided in instances where terms in the prefix of the partial query are ambiguous or uncommon.

20 Claims, 8 Drawing Sheets

GENERATING WORD COMPLETIONS BASED ON SHARED SUFFIX ANALYSIS

CROSS-REFERENCE TO RELATED APPLICATIONS

This application is a continuation under 35 U.S.C. §120 of U.S. patent application Ser. No. 13/239,251, filed Sep. 21, 2011, and entitled "Generating Word Completions Based On Shared Suffix Analysis", which is incorporated by reference herein in its entirety.

BACKGROUND

The present disclosure relates to query processing. In particular, it relates to identifying suggested completions of search queries.

Information retrieval systems, such as Internet search engines, are responsive to a user's query to retrieve information about accessible resources such as Web pages, images, text documents and multimedia content. A search engine may use a variety of statistical measures to determine the relevance of the resources to the user's query.

For a variety of reasons, a user can have difficulty formulating a query that accurately represents the user's information need. To assist the user in formulating an efficient search, a search engine may suggest queries to the user. Some search engines provide suggested query completions to the user as the user is typing a query, essentially completing the query by typing ahead for the user. However, in instances in which the user's query includes terms which are ambiguous or uncommon, the search engine may not provide meaningful suggested query completions to the user.

It is desirable to provide improved techniques for identifying meaningful suggested query completions that are likely to assist the user in completing a query.

SUMMARY

In one implementation, a method of selecting suggested query completions for a partial query is described. The method includes determining a prefix and a suffix of a partial query having multiple terms. The prefix includes one or more terms occurring at a beginning of the partial query, and the suffix includes one or more terms occurring at an end of the partial query. A last term in the prefix precedes a first term in the suffix. The method further includes calculating suffix similarity scores for unique queries having prefixes which do not include the prefix of the partial query as a substring. The suffix similarity score for a unique query is based at least in part on similarity of terms in the suffix of the partial query and terms in a suffix of the unique query. The method further includes selecting one or more of the unique queries as candidate queries for completing the partial query based at least in part on the suffix similarity scores for the unique queries. The method further includes calculating completion scores for unique suffixes among the suffixes of the candidate queries. The completion scores represent an extent to which the unique suffixes are potential query completions for the partial query. The method further includes using the completion scores to select one or more terms of the unique suffixes as suggested query completions for the partial query.

Other implementations may include a non-transitory computer readable storage medium storing instructions executable by a processor to perform a method as described above. Yet another implementation may include a system including memory and one or more processors operable to execute instructions, stored in the memory, to perform a method as described above.

These and other embodiments of the subject matter described herein can each optionally include one or more of the following features. The method can further include where the suffix of the partial query ends with an incomplete term. The method can be further extended by the suffix of at least one of the candidate queries including a term which begins with the incomplete term in the suffix of the partial query.

The method can further include where the suffix of at least one of the candidate queries includes at least two terms in common with the suffix of the partial query. The method can be further extended by the suffix of at least one of the candidate queries including at least three terms in common with the suffix of the partial query.

Selecting one more of the unique queries as candidate queries can include identifying a first set of candidate queries having suffixes including at least three terms in common with the suffix of the partial query. A second set of candidate queries can then be identified that have suffixes including at least two terms in common with the suffix of the partial query. The first set of candidate queries can be selected as the candidate queries for completing the partial query if the first set is not empty. The second set of candidate queries can be selected as the candidate queries for completing the partial query if the second set is empty.

Calculating the completion scores for the unique suffixes can include calculating query popularity scores for the candidate queries indicating frequency of the candidate queries in a log of the past queries. The completion scores for the unique suffixes can then be calculated using the query popularity scores of the corresponding candidate queries.

Using the completion scores can include creating a ranking of the unique suffixes. One or more of the unique suffixes can then be selected as suggested query completions based at least in part on the ranking. Selecting the one or more unique suffixes can include selecting one or more unique queries having completion scores at least a threshold greater than the completion scores of remaining lower ranked unique suffixes.

The method can further include where the candidate queries have suffixes which include the suffix of the partial query as a substring.

The method can further include receiving the partial query. One or more of the selected terms of the unique suffixes can then be sent in response to the received partial query.

Particular embodiments of the subject matter described herein can be implemented for identifying meaningful suggested query completions which can accurately and quickly assist users in finding the information they seek. These suggested query completions can enable efficient query completion by users who may be unfamiliar with the information space about a particular topic.

Particular aspects of one or more embodiments of the subject matter described in this specification are set forth in the drawings and the description below. Other features, aspects, and advantages of the subject matter will become apparent from the description, the drawings, and the claims.

DETAILED DESCRIPTION

Figure 1:
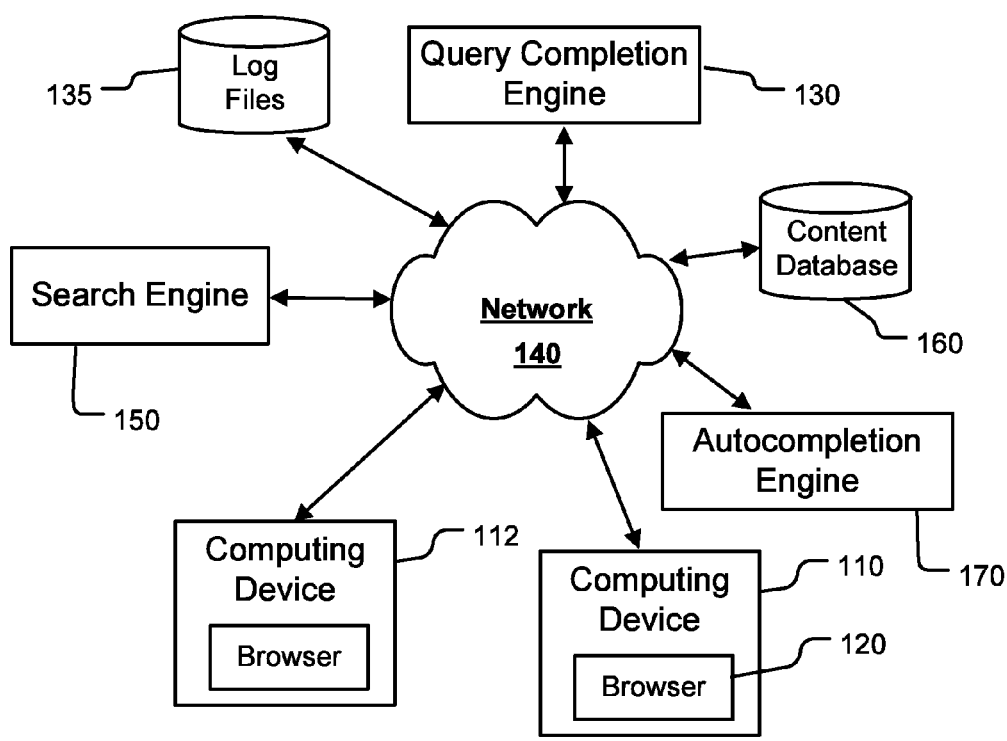
FIG. 1 illustrates a block diagram of an example environment in which selecting suggested query completions for a partial query can be used.

Technology is described herein for identifying suggested query completions for a partial query based upon unique queries which have suffixes similar to the suffix of the partial query, but have prefixes which do not contain the prefix of the partial query. The technology described herein selects suggested query completions for the partial query based on terms occurring at the ends of the unique queries, in a manner which is not limited to past queries that include all of the terms in the partial query. As a result, meaningful suggested query completions that are likely to assist the user in completing a partial query can be provided in instances where terms in the prefix of the partial query are ambiguous or uncommon.

As used herein, a "partial query" is a query formulated by a user prior to an indication by the user that the query is complete. A user may formulate a query in a number of ways. For example, the user may type text into a search field of an application, such as a browser, executing on the user's computing device. The user may for example indicate completion of the query by entering a carriage return or equivalent character. As another example, the user may indicate completion of the query by selecting a search button in a user interface presented to the user during entry of the query. As yet another example, the user may indicate completion of the query by saying a command or pausing more than a predetermined period of time in a speech interface.

A prefix is a sequence of one or more terms occurring at the beginning of a query. A suffix is a sequence of one or more terms occurring at the end of the query. This query may be a partial query or a complete query. The last term in the prefix precedes the first term in the suffix. In some implementations, the last term in the prefix immediately precedes the first term in the suffix. Alternatively, there may one or more terms between the last term in the prefix and the first term in the suffix. The individual terms in a query can be identified for example based on term boundaries. A term boundary is one or more characters in the query used to indicate that one term has ended and another term is beginning. A term boundary can be for example a white space. In some implementations, punctuation may also be considered a term boundary.

A variety of different techniques can be used to determine where a query's prefix ends and the suffix begins. In some implementations, the suffix is a predetermined number of terms at the end of a query, and the prefix is the rest of the terms in the query which precede the suffix. Alternatively, other techniques may be used. For example, in other implementations, the prefix is a predetermined number of terms at the beginning of a query, and the suffix is the rest of the terms in the query after the prefix.

The technology described herein identifies candidate queries for completing the partial queries from unique queries, such as past queries submitted to one or more search engines. A unique query is a query which is not identical to another query. Suffix similarity scores are calculated for unique queries having prefixes which do not include the prefix of the partial query as a substring. As used herein, a first sequence of terms is a "substring" in a second sequence of terms if the second sequence includes all the terms of the first sequence in the same order as the terms occur in the first sequence.

The suffix similarity scores are calculated based at least in part on similarity of terms in the suffix of the partial query and terms in the suffixes of the unique queries. In some implementations, the suffix of the partial query and the suffixes of the unique queries are canonicalized into respective canonical representations using canonicalization rules. The canonical representation of the suffix of the partial query can then be compared to against the canonical representations of the suffixes of the unique queries to produce the similarity scores. The suffix similarity score of a particular unique query may for example be assigned the highest value (e.g. '1') if there is a match between the canonical form of its suffix and that of the suffix of the partial query. Otherwise, the similarity score may be assigned the lowest value (e.g. '0'). Alternatively, other techniques may be used. For example, in some implementations, the candidate queries have suffixes which include the suffix of the partial query as a substring. In such a case, the unique queries which have suffixes which include the suffix of the partial query as a substring may be assigned the highest similarity score value. Otherwise, the similarity score may be assigned the lowest value.

Candidate queries for completing the partial query are then selected from the unique queries based, at least in part on, their corresponding suffix similarity scores.

Completion scores for unique suffixes among the suffixes of the candidate queries are then calculated. The completion scores represent an extent to which the unique suffixes are potential query completions for the partial query. In some implementations, normalization processes such as stemming and the removal of stop words may also be applied to normalize the suffixes of the candidate queries. Identical normalized suffixes can then be grouped together to form a list of unique suffixes. The completion scores are then used to select one or more terms of the unique suffixes as suggested query completions for the partial query.

FIG. 1 illustrates a block diagram of an example environment 100 in which selecting suggested query completions for a partial query can be used. The environment 100 includes client computing devices 110, 112 and a search engine 150. The environment 100 also includes a communication network 140 that allows for communication between various components of the environment 100.

During operation, users interact with the search engine 150 through the client computing devices 110, 112. The client computing devices 110, 112 and the search engine 150 each include memory for storage of data and software applications, a processor for accessing data and executing applications, and components that facilitate communication over the communication network 140. The computing devices 110, 112 execute applications, such as web browsers (e.g. web browser 120 executing on computing device 110), that allows users to formulate complete queries and submit them to the search engine 150. The search engine 150 receives complete queries from the computing devices 110, 112, and executes the queries against a content database 160 of available resources such as Web pages, images, text documents and multimedia content. The search engine 150 identifies content which matches the complete queries, and responds by generating search results which are transmitted to the computing devices 110, 112 in a form that can be presented to the users. For example, in response to a complete query from the computing device 110, the search engine 150 may transmit a search results web page to be displayed in the web browser 120 executing on the computing device 110.

The search engine 150 maintains log files 135 of past complete queries submitted to the search engine 140 by users during prior query sessions. The log files 135 may be collectively stored on one or more computers and/or storage devices. The search engine 150 may maintain an anonymous log of queries, not traceable to a particular user, or it may maintain a user specific log for the user's further reference, at the user's request.

The applications executing on the client computing devices 110, 112 also provide partial queries being formulated by users to the search engine 150, before the users have indicated completion of the queries. The applications may be for example a web browser, a toolbar running in a web browser, or a search client running on the client computing devices 110, 112. In some implementations, the applications provide each character of a query as it is typed or otherwise entered by the users. In other implementations, the applications provide multiple characters at a time following a pause between character entries by the users.

In response to a partial query, the search engine 150 forwards the partial query to an autocompletion engine 170. The autocompletion engine 170 includes memory for storage of data and software applications, a processor for accessing data and executing applications, and components that facilitate communication over the communications network 140.

The autocompletion engine 170 may provide the partial query to a query completion engine 130. The query completion engine 130 processes the partial query to identify suggested query completions for the partial query using the techniques described herein. The query completion engine 130 can be implemented in hardware, firmware, and/or software. The query completion engine 130 is described in more detail below with reference to FIGS. 2-9.

In response to the partial query, the query completion engine 130 can then send one or more suggested query completions for the partial query to the autocompletion engine 170. One or more of the suggested query completions can then be selected by the autocompletion engine 170 and provided as final suggested query completions to a user.

These final suggested query completions represent queries that the users of the computing devices 110, 112 may want to submit instead of the partial queries actually being typed. The final suggested query completions may be displayed within a cascaded drop down menu of the search field of an application, such as a web browser, executing on the user's computing device as the user is typing the query.

The network 140 facilitates communication between the various components in the environment 100. In one implementation, the network 100 includes the Internet. The network 140 can also utilize dedicated or private communication links that are not necessarily part of the Internet. In one implementation, the network 140 uses standard communications technologies, protocols, and/or inter-process communication techniques.

Many other configurations are possible having more or less components than the environment 100 shown in FIG. 1. For example, the environment 100 can include multiple search engines. The environment 100 can also include many more computing devices that submit queries to the search engines.

Figure 2:
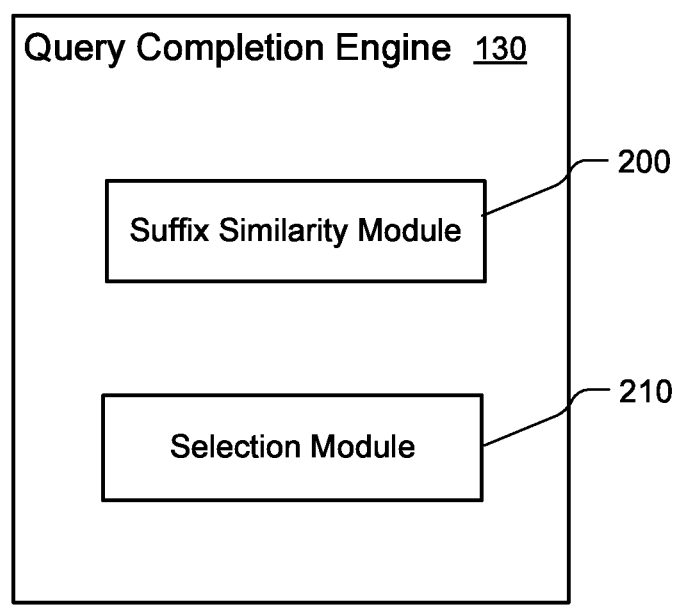
FIG. 2 is a block diagram illustrating example modules within the query completion engine in accordance with one embodiment.

FIG. 2 is a block diagram illustrating example modules within the query completion engine 130. In FIG. 2, the query completion engine 130 includes a suffix similarity module 200 and a selection module 210. Some embodiments may have different and/or additional modules than those shown in FIG. 2. Moreover, the functionalities can be distributed among the modules in a different manner than described herein.

The suffix similarity module 200 analyzes the log files 135 to retrieve unique past queries submitted by users to one or more search engines. Unique past queries that do not appear more than a threshold number of times in the log files 135 may be filtered out. In some alternative implementations, the unique queries may be generated using other techniques.

The suffix similarity module 200 may also produce statistics about the unique past queries in the log files 135. The statistics may include query popularity scores indicating frequency of the unique past queries in the log files 135. The frequency of a particular unique past query can be determined by counting the number of times the particular unique past query appears in the log files 135. In some implementations, the suffix similarity module 200 may utilize additional scoring functions to produce statistics about the unique past queries in the log files 135. These scoring functions may also be utilized to produce statistics in implementations in which unique queries are generated using other techniques.

In response to a partial query, the suffix similarity module 200 determines a prefix and a suffix of the partial query. In some implementations, the suffix is a predetermined number of terms at the end of the partial query (which may include any potentially incomplete term), and the prefix is the remaining terms preceding the suffix.

The suffix similarity module 200 also determines a prefix and suffix of the unique queries. The suffix similarity module 200 then produces suffix similarity scores by processing the suffix of the partial query against the suffixes of unique queries which have prefixes that do not include the prefix of the partial query as a substring. The suffix similarity scores are calculated based at least in part on similarity of terms in the suffix of the partial query and terms in suffixes of the unique queries.

A variety of different techniques may be used to determine where the prefix of a candidate query ends and the suffix of the candidate query begins. Generally, the suffix of a candidate query includes at least as many terms as the suffix of the partial query. In some implementations, the suffix of the candidate query includes the same number of terms as the suffix of the partial query. In such a case, the last term in the candidate query may be considered as a potential completion of the last, potentially incomplete term in the partial query. In other implementations, the suffix of the candidate query includes a greater number of terms than the suffix of the partial query. In such a case, the last terms in the candidate query may be considered as a multiple term completion of the partial query.

The techniques for determining the suffix similarity scores and the range of values can vary from implementation to implementation. For example, in some implementations, the suffix of the partial query and the suffixes of the unique queries are canonicalized into respective canonical representations using canonicalization rules. Examples of canonicalization rules include stemming, stop word removal, word reordering and replacing terms with synonyms. With canonicalization, different suffixes that represent the same or similar user informational intent can be matched, so that suggested query completions can be selected which most likely capture the user's informational need.

In some implementations, the suffix similarity score of a particular unique query is assigned the highest value (e.g. '1') if there is a match between the canonical form of its suffix and that of the suffix of the partial query. Otherwise, the similarity score is assigned the lowest value (e.g. '0'). In such an approach, the unique queries which will be subsequently selected as candidate queries will have suffixes with canonical forms which match the suffix of the partial query. In alternative implementations, the similarity scores may have a value between a range, rather than discrete values.

In other implementations, the unique queries that have suffixes which include the suffix of the partial query as a substring may be assigned the highest similarity score value. Otherwise, the similarity score is assigned the lowest value. In such an approach, the unique queries which will be subsequently selected as candidate queries will have suffixes which include the suffix of the partial query as a substring.

In one implementation, for a partial query of the form "$T_1 T_2 \ldots T_n X$", where $T_i$ are (n) complete terms and X is a potentially incomplete term, a set of unique past queries are identified having the form "$*T_{n-1} T_n T_{n+1}$", where "*" represents the terms in the disregarded prefix of each of the candidate queries, and $T_{n+1}$ is a term that starts with X. In other words, if the last three terms in a unique past query include the last three terms of the partial query as a substring, then the unique past query is selected as a candidate query. For example, for a partial query of the form "person who killed john len", the unique past query "the man who killed john lennon" can be identified as a candidate query for completing the partial query. In such a case, when the last three terms in a unique past query include the last three terms of the partial query as a substring, the suffix similarity score of the unique query may be assigned the highest value. Otherwise, the suffix similarity score may be assigned the lowest value.

The selection module 210 selects one or more of the unique queries as candidate queries based at least in part on the suffix similarity scores for the unique queries. The number of unique queries that are selected can vary from implementation to implementation. In one implementation, a set of unique queries having suffix similarity scores above a threshold are identified. The unique queries selected as candidate queries may for example include all of the unique queries in the set. Alternatively, additional criteria may be applied to the set of unique queries to identify the final candidate queries. If none of the unique queries have a suffix similarity score above the threshold, the selection module 210 may flag the partial query as not having a suggested query completion.

The selection module 210 then calculates completion scores for unique suffixes among the suffixes of the candidate queries. The completion scores represent an extent to which the unique suffixes are potential query completions for the partial query. The techniques for calculating the completion scores and the range of values can vary from implementation to implementation.

In some implementations, normalization processes such as stemming and the removal of stop words may also be applied to normalize the suffixes of the candidate queries. Identical normalized suffixes can then be grouped together to form a list of unique suffixes.

In some implementations, the completion score of a unique suffix is based at least in part on an aggregate of the query popularity scores of each of the candidate queries which include the unique suffix. Alternative implementations may use other techniques for calculating the completion score of a unique suffix. More generally, the completion score of a unique suffix may be a function of the query popularity scores of each of the candidate queries which include the unique suffix. The function can be for example a sum, a sum of log values of the query popularity scores, and potentially using smoothing techniques to take into account unseen events.

In some implementations, a language model is used to calculate the completion scores. The language model may calculate the completion score based on a conditional probability of a term sequence that includes one or more terms in a unique suffix appended to the suffix of the partial query. The language model for this case can be maintained in a table as a vector of terms with a corresponding score/probability of appearance. The language model can be created based on the term sequence occurring over a number of documents, such as html web pages or existing queries.

The selection module 210 uses the completion scores to select terms of one or more of the unique suffixes as suggested query completions for the partial query. The criteria for selecting the unique suffixes can vary from implementation to implementation. The unique suffixes can for example be sorted using the completion scores to create a ranking, and one or more of the unique suffixes can be selected based on the ranking. Alternatively, other criteria may be used. For example, the completion scores of the unique suffixes may be compared to a threshold and the ones that satisfy the threshold may be selected.

The number of unique suffixes which are selected as suggested query completions can vary from implementation to implementation. In one implementation, only the unique suffix having the highest completion score is selected as a suggested query completion. Alternatively, the number of suggested query completions may be greater than one. For example, the two or three highest scoring unique suffixes may be selected.

In one implementation, the completion score of the highest scoring unique suffix is compared to the completion scores of the other unique suffixes. This comparison may be performed to determine whether the highest scoring unique suffix is significantly higher scoring than the rest. This comparison may for example be carried out using a z-test for binomial distributions with a confidence above a value such as five percent. Other techniques may alternatively be used to perform this comparison. For example, this comparison may be carried out using a fixed threshold on the conditional probability that a unique suffix is a completion of the suffix of the partial query.

If the difference between the completion score of the highest scoring unique suffix and the completion scores of the other unique suffixes is above a threshold, the highest scoring unique suffix is selected. If this difference is below the threshold, the selection module 210 may flag the partial query as not having a suggested query completion. Alternatively, if the difference between the two highest scoring unique suffixes and the other unique suffixes is above a threshold, both these two highest scoring unique suffixes may be selected as suggested query completions.

Figure 3:
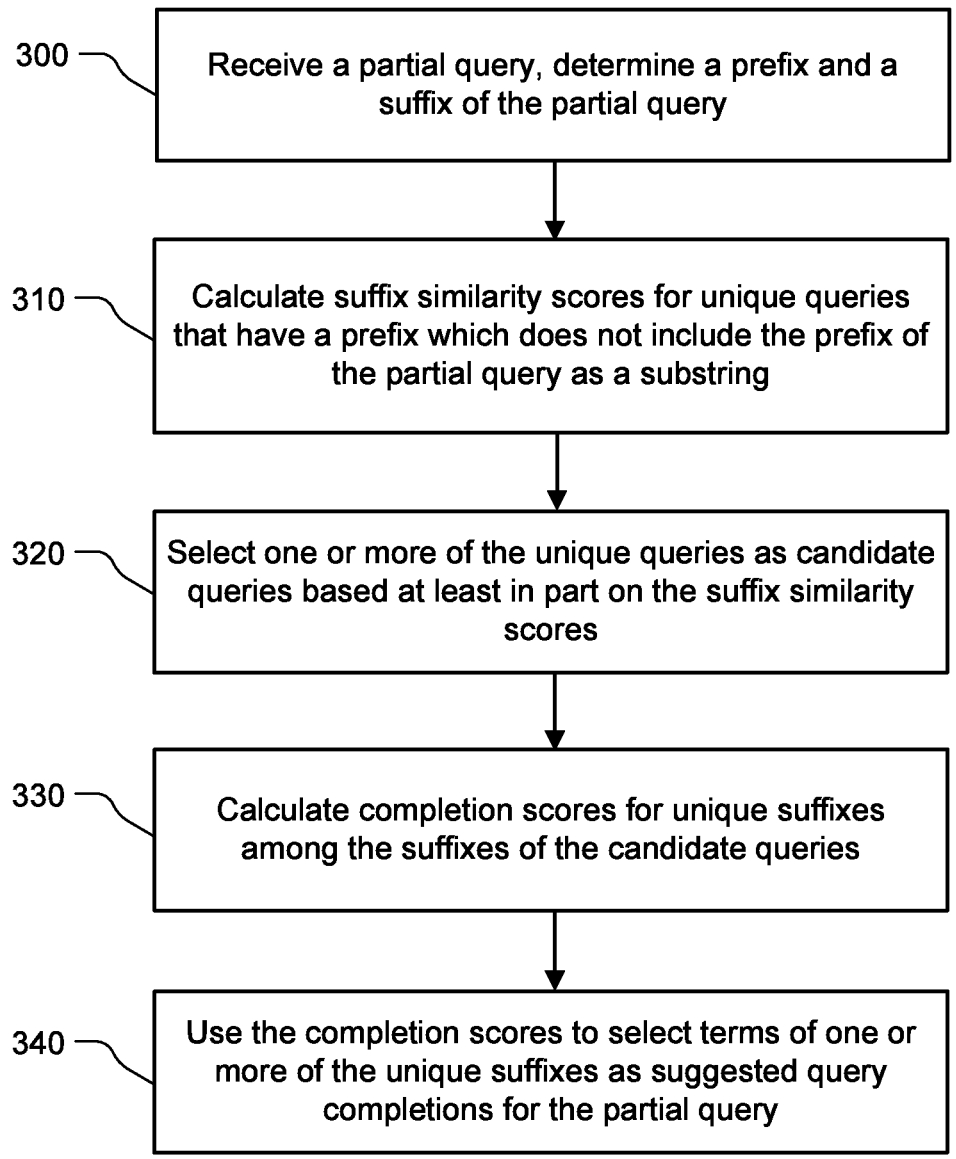
FIG. 3 is a flow chart illustrating an example process for selecting suggested query completions for a partial query.

FIG. 3 is a flow chart illustrating an example process for selecting suggested query completions for a partial query. Other embodiments may perform the steps in different orders and/or perform different or additional steps than the ones illustrated in FIG. 3. For convenience, FIG. 3 will be described with reference to a system of one or more computers that performs the process. The system can be, for example, the query completion engine 130 described above with reference to FIG. 1.

At step 300, the system receives a partial query. The system determines a prefix and a suffix of the partial query. As described above, a variety of different techniques can be used to determine the division between the prefix and the suffix of a query or partial query.

At step 310, the system calculates suffix similarity scores for unique queries that have a prefix which does not include the prefix of the partial query as a substring. At step 320, the system selects one or more of the unique queries as candidate queries based at least in part on the suffix similarity scores. In this example, the system maintains the list of candidate queries and the corresponding query popularity scores in a query popularity table.

Figure 4:
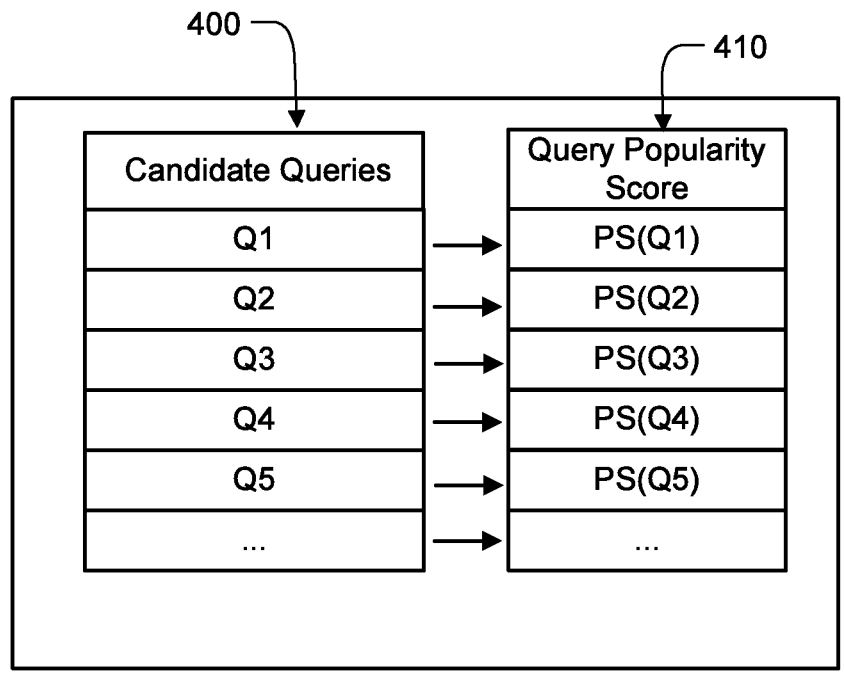
FIG. 4 illustrates an example query popularity table for the list of candidate queries.

FIG. 4 illustrates an example query popularity table for the list of candidate queries. The leftmost column 400 contains the candidate queries (Q1, Q2, Q3 . . . ) for the partial query. The column 410 labeled "Query Popularity Score" contains the query popularity score for each candidate query. In this example, the query popularity scores indicate frequency of the unique candidate queries in the log files 135. The frequency of a particular candidate query can be determined by counting the number of times the particular candidate query appears in the log files 135.

Returning to FIG. 3, at step 330, the system calculates the completion scores for unique suffixes among the suffixes of the candidate queries. The completion scores represent an extent (e.g. a probability) to which the unique suffixes are potential query completions for the partial query. In this example, the system maintains the unique suffixes and the corresponding completion scores in a completion table.

Figure 5:
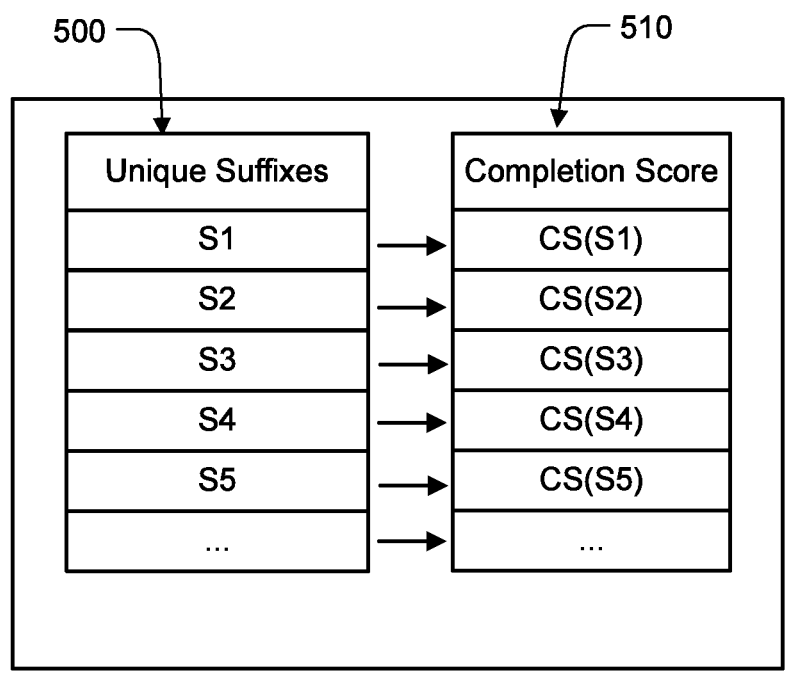
FIG. 5 illustrates an example completion table for the unique suffixes.

FIG. 5 illustrates an example completion table for the unique suffixes. The leftmost column 500 contains the unique suffixes (S1, S2, S3 . . . ) for the partial query. The column labeled "Completion Score" contains the completion score of the unique suffixes.

Returning to FIG. 3, at step 340 the system uses the completion scores of the unique suffixes to select terms of one or more of the unique suffixes as suggested query completions for the partial query.

Figure 6:
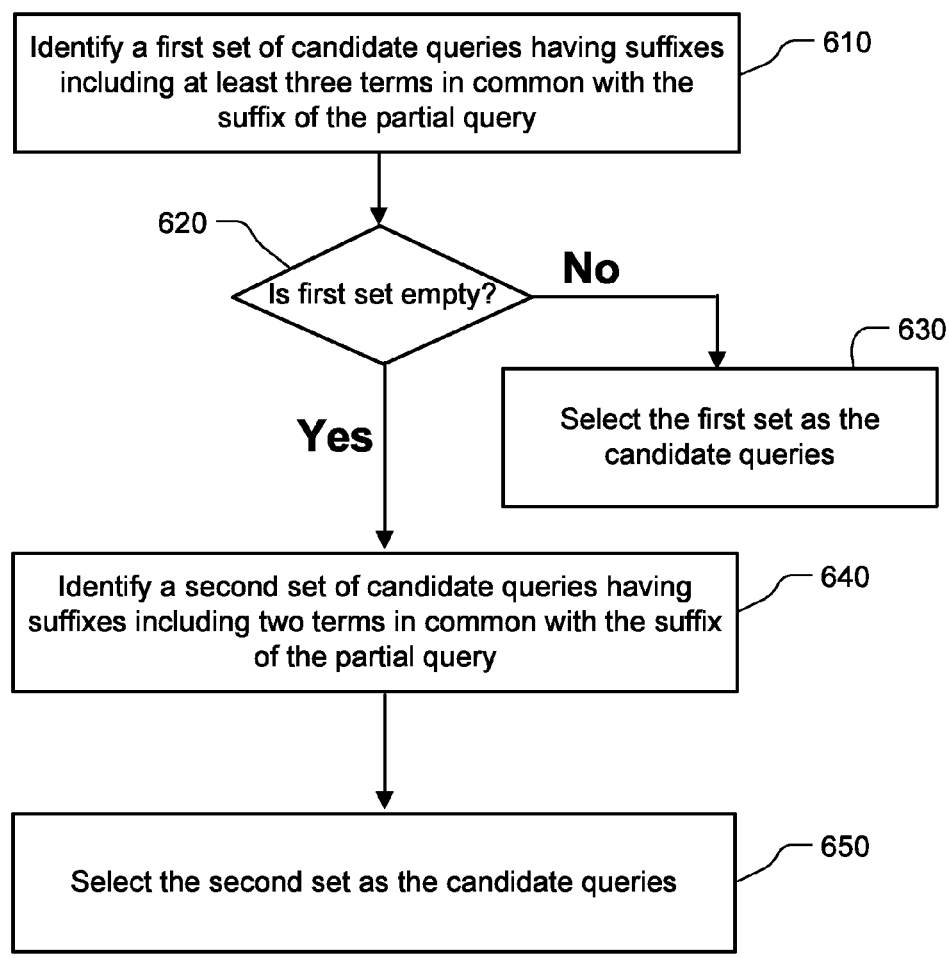
FIG. 6 is a flow chart illustrating an example process for identifying candidate queries.

FIG. 6 is a flow chart illustrating an example process for identifying candidate queries in step 310 of FIG. 3. Other embodiments may perform the steps in different orders, utilize a different number of common terms, and/or perform different or additional steps than the ones illustrated in FIG. 6. For convenience, FIG. 6 will be described with reference to a system of one or more computers that performs the process. The system can be for example, the query completion engine 130 described above with reference to FIG. 1.

At step 610, the system identifies a first set of candidate queries having suffixes which include at least three terms in common and arranged in the same order as terms within the suffix of the partial query. In some implementations, the system ignores stop words in the partial query and the candidate queries when counting the number of terms in common. In instances in which the last term in the partial query is a potentially incomplete term (e.g. the user has not entered a last white space), a term in a candidate query that starts with the last term in the partial query may be considered to be one of the terms in common with the partial query.

At step 620, the system determines whether the first set is an empty set. The first set is an empty set if there are not any candidate queries having suffixes which include at least three terms in common with and arranged in the same order as terms within the suffix of the partial query. If the first set is not empty, the process continues to step 630. At step 630, the system selects the first set of candidate queries as the identified candidate queries.

If the first set is an empty set, the process continues to step 640. At step 640, the system identifies a second set of candidate queries having suffixes which include at least two terms in common and arranged in the same order as terms within the suffix of the partial query. At step 650, the system then selects the second set of candidate queries as the identified candidate queries.

To aid in the understanding of certain processes described herein, an example for selecting suggested query completions is provided below. In this example, the unique queries "property for sale in scotland with land", "castles for sale in scotland with lakes", "properties for sale in scotland with land", "houses for sale in scotland with land", and "horse trailers for sale in scotland with loft" make up the list of identified candidate queries for the partial query "large houses for sale in scotland with l". In this example, the suffix is determined by selecting the last five terms at the end of a unique query or a partial query, and the prefix is the rest of the terms in the past query or partial query.

Figure 7:
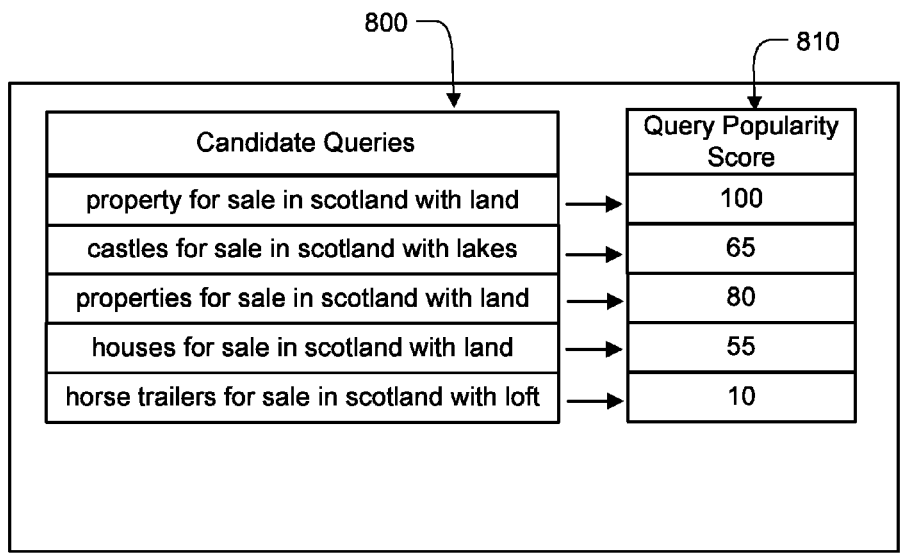
FIG. 7 illustrates an example query popularity table including example the query popularity scores.

For this example, the query popularity scores are given by the query popularity table shown in FIG. 7. The query popularity score for a particular candidate query in this example is determined by counting the number of times the particular candidate query appears in the log files 135. Suffixes of the candidate queries are then created by removing the prefixes from the candidate queries.

Figure 8:
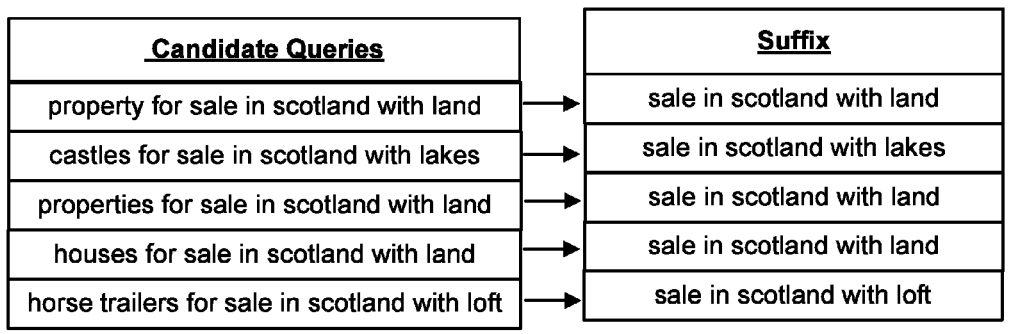
FIG. 8 illustrates of candidate queries and their corresponding suffixes.

As mentioned above, the suffix of a candidate query in this example is the last five terms in the candidate query. The candidate queries and their suffixes in this example are shown in FIG. 8. As show in FIG. 8, each of the candidate queries "property for sale in scotland with land", "properties for sale in scotland with land" and "houses for sale in scotland with land" have the same suffix "sale in scotland with land".

In this example, the completion score of a given unique suffix is calculated as a sum of the query popularity scores of each of the candidate queries which have the unique suffix as a suffix, divided by a sum of the query popularity scores of all of the candidate queries. Thus, in this example, the completion score of the suffix "sale in scotland with land" is 235 (the sum of the query popularity scores of the candidate queries "property for sale in scotland with land", "properties for sale in scotland with land", "houses for sale in scotland with land"), divided by 310 (the sum of the query popularity scores of all the candidate queries). Thus, in this example the completion score of the suffix "sale in scotland with land" is 235/310, or about 0.758. The completion scores for the other unique suffixes can be calculated in a similar manner. In this example, this results in the following completion score table:

| Unique Suffixes | Completion Score |
| --- | --- |
| sale in scotland with land | 0.758 |
| sale in scotland with lakes | 0.210 |
| sale in scotland with loft | 0.032 |

Thus, in this example the unique suffix "sale in scotland with land" has the highest completion score. As a result, in response to the partial query, the query completion engine 130 can then select the last term "land" within the unique suffix "sale in scotland with land" as a suggested query completion for the incomplete term "l" at the end of the partial query. The query completion engine 130 can then provide the suggested query completion to the autocompletion engine 170.

The autocompletion engine 170 can then provide a final suggested query completion to a user. These final suggested query completions represent queries that the users of the computing devices 110, 112 may want to submit instead of the partial queries actually being typed. The final suggested query completions may be displayed within a cascaded drop down menu of the search field of an application, such as a web browser, executing on the user's computing device as the user is typing the query.

Figure 9A:
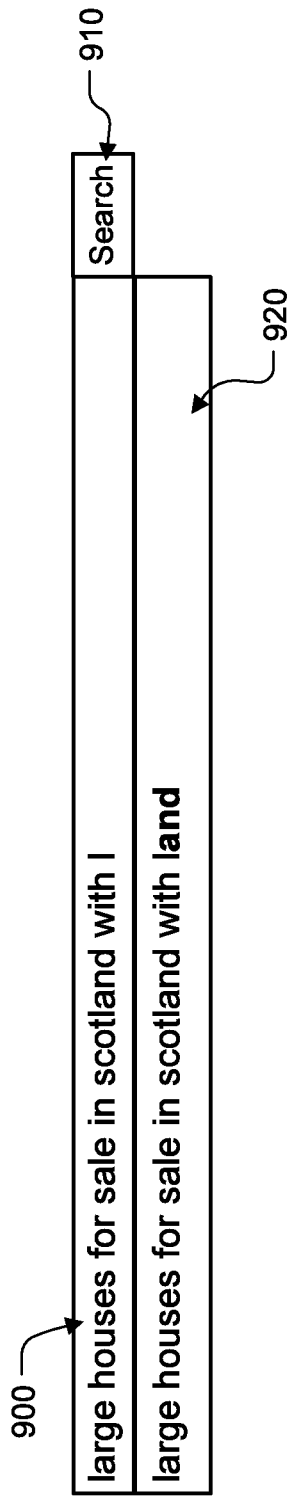
FIGS. 9A and 9B are screen shots illustrating example environments that can be used to provide suggested query completions to a user.
Figure 9B:
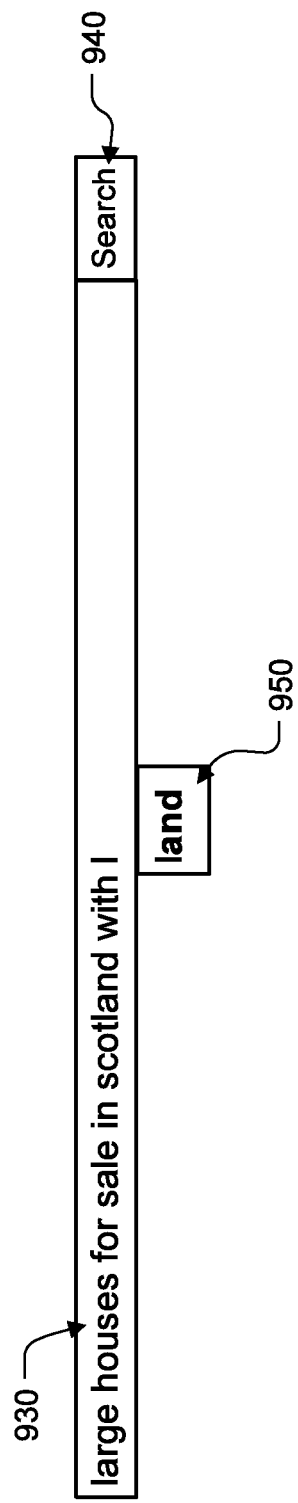

FIGS. 9A and 9B are screen shots illustrating example environments that can be used to provide suggested query completions to a user. In FIG. 9A, the partial screen shot includes a search field representation 900 and a search button representation 910. In this example, when the user is entering the query "large houses for sale in scotland with 1" into the search field representation 910, a cascaded drop down menu 920 of the search field 900 is displayed. In this example, the drop down menu 920 includes a suggested query completion "large houses for sale in scotland with land", where the term "land" is appended to the user's query as a proposed completion of the character "1" at the end of the user's query.

In FIG. 9B, the partial screen shot includes a search field representation 930 and a search button representation 940. In this example, when the user enters the query "large houses for sale in scotland with 1" into the search field representation 930, a cascaded drop down menu 950 of the search field 900 is displayed. In this example, the drop down menu 920 includes a suggested query completion "land" as a completion of the character "1" at the end of the user's query.

Figure 10:
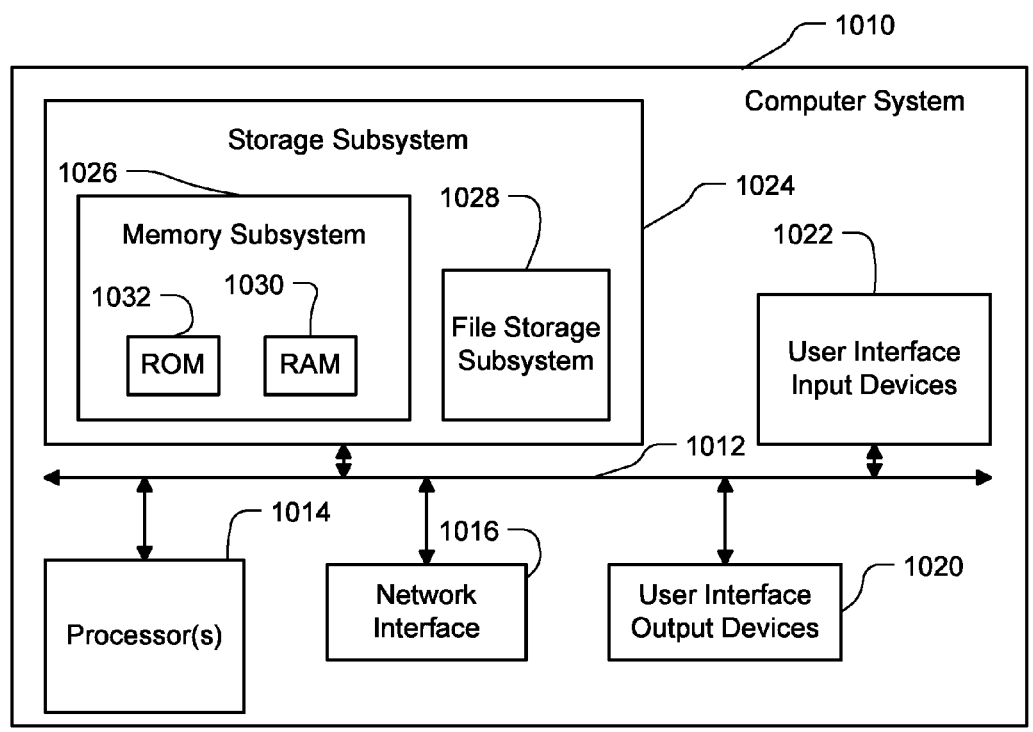
FIG. 10 is a block diagram of an example computer system.

FIG. 10 is a block diagram of an example computer system. Computer system 1010 typically includes at least one processor 1014 which communicates with a number of peripheral devices via bus subsystem 1012. These peripheral devices may include a storage subsystem 1024, comprising for example memory devices and a file storage subsystem, user interface input devices 1022, user interface output devices 1020, and a network interface subsystem 1016. The input and output devices allow user interaction with computer system 1010. Network interface subsystem 1016 provides an interface to outside networks, including an interface to communication network 1040, and is coupled via communication network 1018 to corresponding interface devices in other computer systems. Communication network 1018 may comprise many interconnected computer systems and communication links. These communication links may be wireline links, optical links, wireless links, or any other mechanisms for communication of information. While in one embodiment, communication network 1018 is the Internet, in other embodiments, communication network 1018 may be any suitable computer network.

User interface input devices 1022 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include possible types of devices and ways to input information into computer system 1010 or onto communication network 1018.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1010 to the user or to another machine or computer system.

Storage subsystem 1024 stores programming and data constructs that provide the functionality of some or all of the modules described herein, including the logic to select suggested query completions for a partial query according to the processes described herein. These software modules are generally executed by processor 1014 alone or in combination with other processors.

Memory 1026 used in the storage subsystem can include a number of memories including a main random access memory (RAM) 1032 for storage of instructions and data during program execution and a read only memory (ROM) 1030 in which fixed instructions are stored. A file storage subsystem 1028 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem in the storage subsystem 1024, or in other machines accessible by the processor.

Bus subsystem 1012 provides a mechanism for letting the various components and subsystems of computer system 1010 communicate with each other as intended. Although bus subsystem 1012 is shown schematically as a single bus, alternative embodiments of the bus subsystem may use multiple busses.

Computer system 1010 can be of varying types including a workstation, server, computing cluster, blade server, server farm, or any other data processing system or computing device. Due to the ever-changing nature of computers and networks, the description of computer system 1010 depicted in FIG. 10 is intended only as a specific example for purposes of illustrating the preferred embodiments. Many other configurations of computer system 1010 are possible having more or less components than the computer system depicted in FIG. 10.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for selecting suggested query completions for a partial query, systems including logic and resources to select suggested query completions for a partial query, systems that take advantage of computer-assisted methods for selecting suggested query completions for a partial query, media impressed with logic to select suggested query completions for a partial query, data streams impressed with logic to select suggested query completions for a partial query, or computer-accessible services that carry out computer-assisted methods for selecting suggested query completions for a partial query. It is contemplated that modifications and combinations will readily occur to those skilled in the art, which modifications and combinations will be within the scope of the following claims.

We claim as follows:

1. A method of selecting suggested query completions for a partial query, the method including:
   determining a prefix and a suffix of a partial query having multiple terms, the prefix including one or more terms occurring at a beginning of the partial query, the suffix including one or more terms occurring at an end of the partial query, wherein a last term in the prefix precedes a first term in the suffix;
   identifying a first set of candidate queries having prefixes which do not include the prefix of the partial query as a substring and having suffixes including at least three terms in common with the suffix of the partial query;

identifying a second set of candidate queries having prefixes which do not include the prefix of the partial query as a substring and having suffixes including at least two terms in common with the suffix of the partial query;

selecting the first set of candidate queries as candidate queries for completing the partial query if the first set is not empty, and selecting the second set of candidate queries as the candidate queries for completing the partial query if the first set is empty; and selecting one or more terms of unique suffixes among the suffixes of the candidate queries as suggested query completions for the partial query;

wherein the method is performed by one or more computer processors.

2. The method of claim 1, wherein the suffix of the partial query ends with an incomplete term.

3. The method of claim 2, wherein the suffix of at least one of the candidate queries includes a term which begins with the incomplete term in the suffix of the partial query.

4. The method of claim 1, further comprising calculating completion scores for unique suffixes among the suffixes of the candidate queries, the completion scores representing an extent to which the unique suffixes are potential query completions for the partial query.

5. The method of claim 4, further comprising using the completion scores in selecting the one or more terms of the unique suffixes as the suggested query completions for the partial query.

6. The method of claim 5, wherein calculating the completion scores for the unique suffixes includes:

calculating query popularity scores for the candidate queries indicating frequency of the candidate queries in a log of past queries submitted to one or more search engines; and calculating the completion scores for the unique suffixes using the query popularity scores of the corresponding candidate queries.

7. The method of claim 6, wherein using the completion scores includes:

using the completion scores to create a ranking of the unique suffixes; and selecting one or more of the unique suffixes as the suggested query completions based at least in part on the ranking.

8. The method of claim 7, wherein selecting the one or more unique suffixes includes selecting the one or more unique suffixes having completion scores at least a threshold greater than the completion scores of remaining lower ranked unique suffixes.

9. The method of claim 1, wherein the candidate queries have suffixes which include the suffix of the partial query as a substring.

10. The method of claim 1, further comprising:

receiving the partial query; and sending one or more of the selected terms of the unique suffixes in response to receiving the partial query.

11. A system including memory and one or more processors operable to execute instructions, stored in the memory, to select suggested query completions for a partial query, including instructions to:

determine a prefix and a suffix of a partial query having multiple terms, the prefix including one or more terms occurring at a beginning of the partial query, the suffix including one or more terms occurring at an end of the partial query, wherein a last term in the prefix precedes a first term in the suffix;

identify a first set of candidate queries having prefixes which do not include the prefix of the partial query as a substring and having suffixes including at least three terms in common with the suffix of the partial query;

identify a second set of candidate queries having prefixes which do not include the prefix of the partial query as a substring and having suffixes including at least two terms in common with the suffix of the partial query;

select the first set of candidate queries as candidate queries for completing the partial query if the first set is not empty, and selecting the second set of candidate queries as the candidate queries for completing the partial query if the first set is empty; and select one or more terms of unique suffixes among the suffixes of the candidate queries as suggested query completions for the partial query.

12. The system of claim 11, wherein the suffix of the partial query ends with an incomplete term.

13. The system of claim 12, wherein the suffix of at least one of the candidate queries includes a term which begins with the incomplete term in the suffix of the partial query.

14. The system of claim 11, wherein the instructions further include instructions to calculate completion scores for unique suffixes among the suffixes of the candidate queries, the completion scores representing an extent to which the unique suffixes are potential query completions for the partial query.

15. The system of claim 14, wherein the instructions further include instructions to use the completion scores in selecting the one or more terms of the unique suffixes as the suggested query completions for the partial query.

16. The system of claim 15, wherein the instructions to calculate the completion scores for the unique suffixes include instructions to:

calculate query popularity scores for the candidate queries indicating frequency of the candidate queries in a log of past queries submitted to one or more search engines; and calculate the completion scores for the unique suffixes using the query popularity scores of the corresponding candidate queries.

17. The system of claim 16, wherein the instructions to use the completion scores include instructions to:

use the completion scores to create a ranking of the unique suffixes; and select one or more of the unique suffixes as the suggested query completions based at least in part on the ranking.

18. The system of claim 17, wherein the instructions to select the one or more unique suffixes include instructions to select the one or more unique suffixes having completion scores at least a threshold greater than the completion scores of remaining lower ranked unique suffixes.

19. The system of claim 11, wherein the candidate queries have suffixes which include the suffix of the partial query as a substring.

20. A non-transitory computer readable storage medium storing computer instructions executable by a processor to perform a method of selecting suggested query completions for a partial query, the method including:

determining a prefix and a suffix of a partial query having multiple terms, the prefix including one or more terms occurring at a beginning of the partial query, the suffix including one or more terms occurring at an end of the partial query, wherein a last term in the prefix precedes a first term in the suffix;

identifying a first set of candidate queries having prefixes which do not include the prefix of the partial query as a substring and having suffixes including at least three terms in common with the suffix of the partial query;

identifying a second set of candidate queries having prefixes which do not include the prefix of the partial query as a substring and having suffixes including at least two terms in common with the suffix of the partial query;

selecting the first set of candidate queries as candidate queries for completing the partial query if the first set is not empty, and selecting the second set of candidate queries as the candidate queries for completing the partial query if the first set is empty; and selecting one or more terms of unique suffixes among the suffixes of the candidate queries as suggested query completions for the partial query.

* * * * *